(12) United States Patent
Sobel et al.

(10) Patent No.: US 11,294,678 B2
(45) Date of Patent: Apr. 5, 2022

(54) SCHEDULER QUEUE ASSIGNMENT

(71) Applicant: Advanced Micro Devices, Inc., Santa Clara, CA (US)

(72) Inventors: Matthew T. Sobel, Boxborough, MA (US); Donald A. Priore, Groton, MA (US); Alok Garg, Maynard, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 156 days.

(21) Appl. No.: 15/991,088

(22) Filed: May 29, 2018

(65) Prior Publication Data

US 2019/0369991 A1 Dec. 5, 2019

(51) Int. Cl.
*G06F 7/38* (2006.01)
*G06F 9/00* (2006.01)
(Continued)

(52) U.S. Cl.
CPC .............. *G06F 9/3016* (2013.01); *G06F 7/57* (2013.01); *G06F 9/3836* (2013.01); *G06F 9/4881* (2013.01); *G06F 9/3802* (2013.01)

(58) Field of Classification Search
CPC .... G06F 9/4881; G06F 9/3836; G06F 9/3016; G06F 7/57; G06F 9/38
(Continued)

(56) References Cited

U.S. PATENT DOCUMENTS 6,519,683 B2 * 2/2003 Samra ................... G06F 9/3802
711/125
6,782,445 B1 8/2004 Olgiati et al.
(Continued)

FOREIGN PATENT DOCUMENTS

| EP | 2466476 A1 | 6/2012 |
| WO | 9900936 A1 | 1/1999 |
| WO | 2019231904 A1 | 12/2019 |

OTHER PUBLICATIONS

International Search Report and Written Opinion in International Application No. PCT/US2019/034161, dated Sep. 18, 2019, 14 pages.
"Efficient Scheduling and Operand Renaming of Groups of Instructions", Research Disclosure, Apr. 1, 1999, pp. 580-584, No. 420138, Kenneth Mason Publications, UK, GB.
(Continued)

*Primary Examiner* — Chun Kuan Lee
(74) *Attorney, Agent, or Firm* — Kowert Hood Munyon Rankin and Goetzel PC; Rory D. Rankin

(57) ABSTRACT

Systems, apparatuses, and methods for implementing scheduler queue assignment logic are disclosed. A processor includes at least a decode unit, scheduler queue assignment logic, scheduler queues, pickers, and execution units. The assignment logic receives a plurality of operations from a decode unit in each clock cycle. The assignment logic includes a separate logical unit for each different type of operation which is executable by the different execution units of the processor. For each different type of operation, the assignment logic determines which of the possible assignment permutations are valid for assigning different numbers of operations to scheduler queues in a given clock cycle. The assignment logic receives an indication of how many operations to assign in the given clock cycle, and then the assignment logic selects one of the valid assignment permutations for the number of operations specified by the indication.

20 Claims, 8 Drawing Sheets

(51) Int. Cl.
*G06F 9/44* (2018.01)
*G06F 9/30* (2018.01)
*G06F 7/57* (2006.01)
*G06F 9/38* (2018.01)
*G06F 9/48* (2006.01)

(58) Field of Classification Search
USPC ........................................................ 712/220
See application file for complete search history.

(56) References Cited

U.S. PATENT DOCUMENTS

| | | | |
|---|---|---|---|
| 6,782,461 B2 | 8/2004 | Lam | |
| 7,047,322 B1 | 5/2006 | Bauman et al. | |
| 7,406,554 B1 | 7/2008 | Huffman | |
| 7,689,793 B1 | 3/2010 | Solt et al. | |
| 7,768,910 B2 | 8/2010 | Neidhardt et al. | |
| 9,397,961 B1 | 7/2016 | Bailey | |
| 9,424,045 B2* | 8/2016 | Airaud | G06F 9/30196 |
| 9,606,800 B1* | 3/2017 | Hameenanttila | G06F 9/3836 |
| 10,552,163 B2 | 2/2020 | Chan | |
| 10,601,723 B2 | 3/2020 | Smith et al. | |
| 2002/0019927 A1* | 2/2002 | Hondou | G06F 9/3836 712/214 |
| 2004/0151197 A1 | 8/2004 | Hui | |
| 2005/0283772 A1 | 12/2005 | Muthukumar et al. | |
| 2006/0080478 A1 | 4/2006 | Seigneret et al. | |
| 2006/0174247 A1 | 8/2006 | Farrell et al. | |
| 2007/0220388 A1 | 9/2007 | Quereshi et al. | |
| 2007/0223372 A1 | 9/2007 | Haalen et al. | |
| 2008/0320274 A1 | 12/2008 | Singh et al. | |
| 2009/0019264 A1 | 1/2009 | Correale, Jr. et al. | |
| 2009/0019265 A1 | 1/2009 | Correale, Jr. et al. | |
| 2010/0241760 A1 | 9/2010 | Zhang et al. | |
| 2010/0318716 A1 | 12/2010 | Nguyen | |
| 2010/0325394 A1 | 12/2010 | Golla et al. | |
| 2011/0044699 A1 | 2/2011 | Li et al. | |
| 2011/0078697 A1 | 3/2011 | Smittle et al. | |
| 2011/0145616 A1 | 6/2011 | Rychlik et al. | |
| 2012/0144175 A1 | 6/2012 | Venkataramanan et al. | |
| 2014/0379506 A1 | 12/2014 | Marshall et al. | |
| 2014/0380324 A1 | 12/2014 | Xiao et al. | |
| 2015/0081941 A1 | 3/2015 | Brown et al. | |
| 2015/0095666 A1 | 4/2015 | Ananthakrishnan et al. | |
| 2015/0106595 A1 | 4/2015 | Khot et al. | |
| 2017/0017490 A1* | 1/2017 | Caulfield | G06F 9/3802 |
| 2017/0177261 A1 | 6/2017 | Filderman et al. | |
| 2017/0230269 A1 | 8/2017 | Kamath et al. | |
| 2019/0163486 A1 | 5/2019 | Sinharoy et al. | |
| 2019/0220949 A1 | 7/2019 | Dutta et al. | |
| 2019/0347125 A1 | 11/2019 | Sankaran et al. | |

OTHER PUBLICATIONS

Shah et al., "Optimal Queue-Size Scaling in Switched Networks", The Annals of Applied Probability, Sep. 3, 2014, 40 pages, vol. 24, No. 6, Institute of Mathematical Statistics, https://arxiv.org/pdf/1110.4697.pdf. [Retrieved Apr. 2, 2018].

International Search Report and Written Opinion in International Application No. PCT/US2019/026571, dated Jun. 21, 2019, 12 pages.

International Search Report and Written Opinion in International Application No. PCT/US2020/063765, dated Mar. 22, 2021, 11 pages.

Non-Final Office Action in U.S. Appl. No. 16/709,527, dated Jul. 30, 2021, 21 pages.

* cited by examiner

SCHEDULER QUEUE ASSIGNMENT

BACKGROUND

Description of the Related Art

A processor pipeline includes many different units which operate on instructions being executed. These units include a decode unit, scheduler queues, pickers, and execution units. The decode unit decodes fetched instructions into instruction operations. Instruction operations are also referred to as "ops" herein. Generally speaking, an op is an operation that the hardware included in the execution units is capable of executing. In various implementations, each instruction translates to one or more ops which, when executed, result in the performance of the operations defined for that instruction according to an instruction set architecture.

Pickers select ops out of the scheduler queues to be executed by the execution units. In various clock cycles, not enough ops are available to execute on all of the execution units. In other cycles, too many ops are ready that are not all able to be executed by the execution units. Accordingly, techniques for improving the utilization and/or throughput of execution units are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
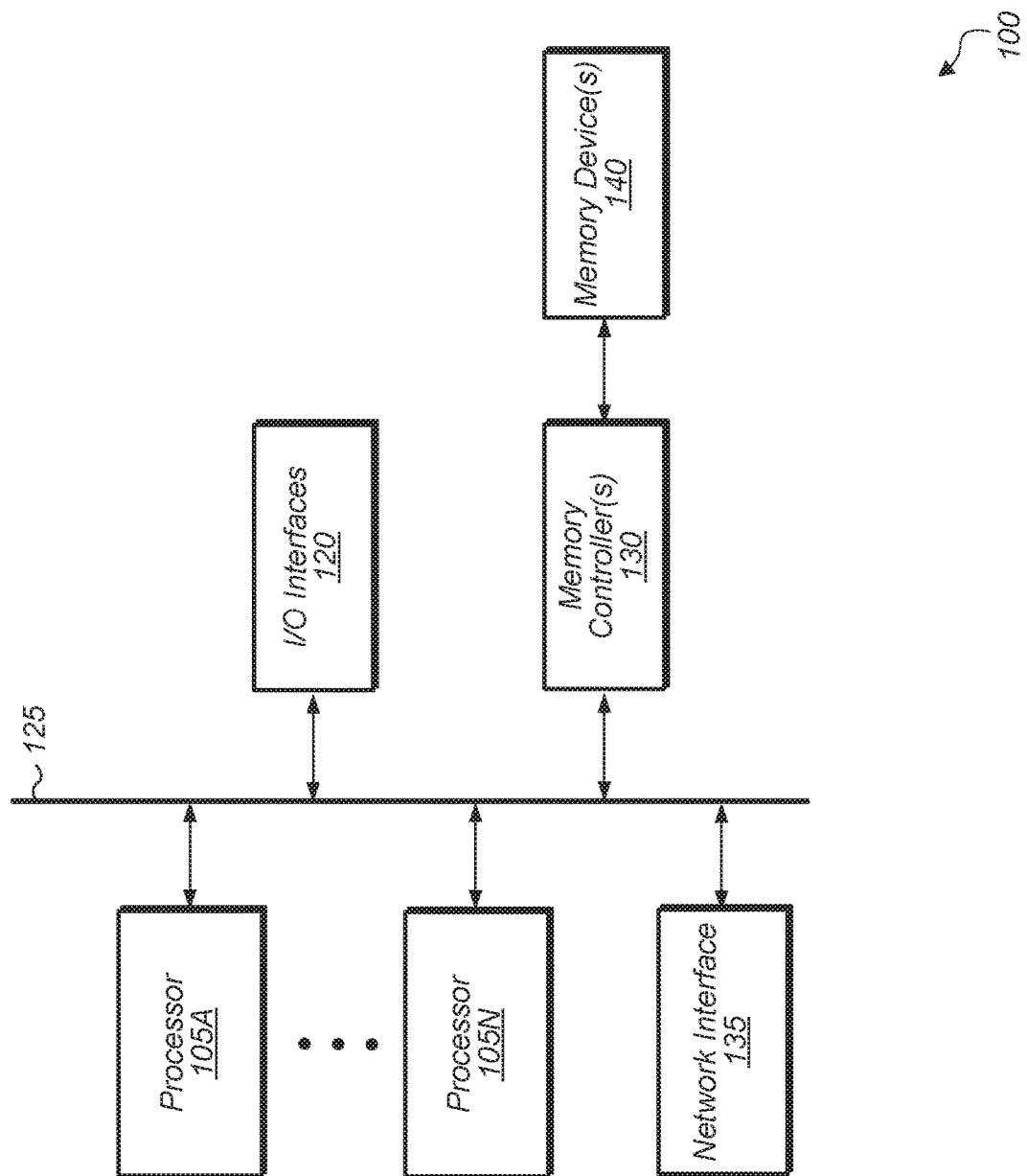
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing scheduler queue assignment logic are disclosed herein. A system includes one or more processors coupled to one or more memories. Each processor includes a processor pipeline with a plurality of pipeline stages for fetching, processing, and executing instructions. In one implementation, the processor employs out-of-order execution of instructions. Instructions are fetched and then decoded by a decode unit into instruction operations (or ops). The decode unit conveys the decoded ops to scheduler queue assignment logic. The scheduler queue assignment logic separates the ops into different streams based on the types of ops (e.g., arithmetic logic unit (ALU) ops, address generation ops). For example, if there are three different types of ops, then the assignment logic separates the ops into a first stream, a second stream, and a third stream. Each stream is then fed into a separate logical unit which processes assignment possibilities for the specific type of op in the stream.

In one implementation, each separate logical unit (corresponding to a different op type) checks the validity of a plurality of different permutation assignments. For example, if there are five scheduler queues with attached pickers coupled to execution units of a given op type and five different ops of one or more types for the current clock cycle, then the given logical unit (for the given op type) determines which of the 120 possible assignment permutations are valid when the five different ops are assigned to these five different scheduler queues. Generally speaking, an assignment permutation defines an assignment of one or more operations to one or more scheduler queues. To determine if a given assignment permutation is valid, a determination is made as to whether a given assignment permutation results in each op being assigned to an execution unit that is able to process an op of that type (i.e., the assignment permutation results in a valid assignment of ops for processing). Also, the given logical unit determines which of the possible assignment permutations are valid when fewer than five ops are assigned to the different scheduler queues. For example, the given logical unit determines which assignment permutations are valid if only four ops are assigned to four of the five different scheduler queues. Also, the given logical unit determines which assignment permutations are valid if only three ops are assigned to three of the five different scheduler queues. Similarly, the given logical unit determines which assignment permutations are valid if only two ops are assigned to two of the five different scheduler queues and if only a single op is assigned to one of the five different scheduler queues. It should be understood that other implementations will have other numbers of different scheduler queues besides five. However, the techniques described above are able to be performed in a similar fashion for these other implementations.

An assignment permutation is valid if each op is assigned to a scheduler queue with an attached picker which feeds an execution unit that is able to process the specific type of op. In various implementations, some execution units are only able to execute a subset of all of the different op types. Also, a given op type might have multiple different sub-types which are only able to be executed by certain execution units. For example, ALU ops include addition ops, multiplication ops, division ops, and so on, but in one implementation, not all of the ALU execution units are able to execute division ops. Other ALU execution units might be able to execute only a subset of all of the different possible ALU op types. Similarly, for other types of ops, certain execution units might be able to execute only a subset of these op types while other execution units are able to execute all of these op types.

In one implementation, when a given logical unit determines which assignment permutations are valid when one or more of the scheduler queues will not be assigned an op, the given logical unit receives inputs regarding the occupancy status of the different scheduler queues (i.e., how many operations are currently stored in the queue—how "full" is the queue). The given logical unit uses these inputs to help determine which valid assignment permutation to select if multiple valid assignment permutations exist. For example, the given logical unit avoids scheduling an op to the scheduler queue currently storing the highest number of ops among the various scheduler queues. In other words, the scheduler queue which has the highest occupancy will be the scheduler queue which is not assigned an op for the given cycle. When the given logical unit is checking the validity of assignment permutations that leave more than one scheduler queue without an op, the given logical unit selects the queues with the most ops as the queues which are not assigned ops.

In a given cycle, the scheduler queue assignment logic generates validity signals for the different assignment permutations and for different numbers of ops being assigned in the given cycle. The scheduler queue assignment logic also generates these validity signals for each different op type supported by the processor. In one implementation, the scheduler queue assignment logic receives an indication of how many ops to assign in the given cycle. This indication is generated in parallel with the scheduler queue assignment logic generating the validity signals. The scheduler queue assignment logic assigns a number of ops in the given cycle to match the number of ops specified by this indication. In other words, this indication narrows down which of the validity signals are considered for assigning ops in the given cycle. For example, if the indication specifies assigning seven ops in the given cycle, then the scheduler queue assignment logic selects one of the valid assignment permutations for a seven-op assignment. In one implementation, the scheduler queue assignment logic selects the first valid assignment permutation for a seven-op assignment. Alternatively, if the indication specifies assigning three ops in the given cycle, then the scheduler queue assignment logic selects one of the valid assignment permutations for a three-op assignment. For other indications specifying other numbers of ops to assign, the scheduler queue assignment logic selects one of the valid assignment permutations for the specified number. By using these and other techniques described in the remainder of the disclosure, the processor is able to dynamically assign ops to the various execution units in a way that maximizes throughput for the execution units.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
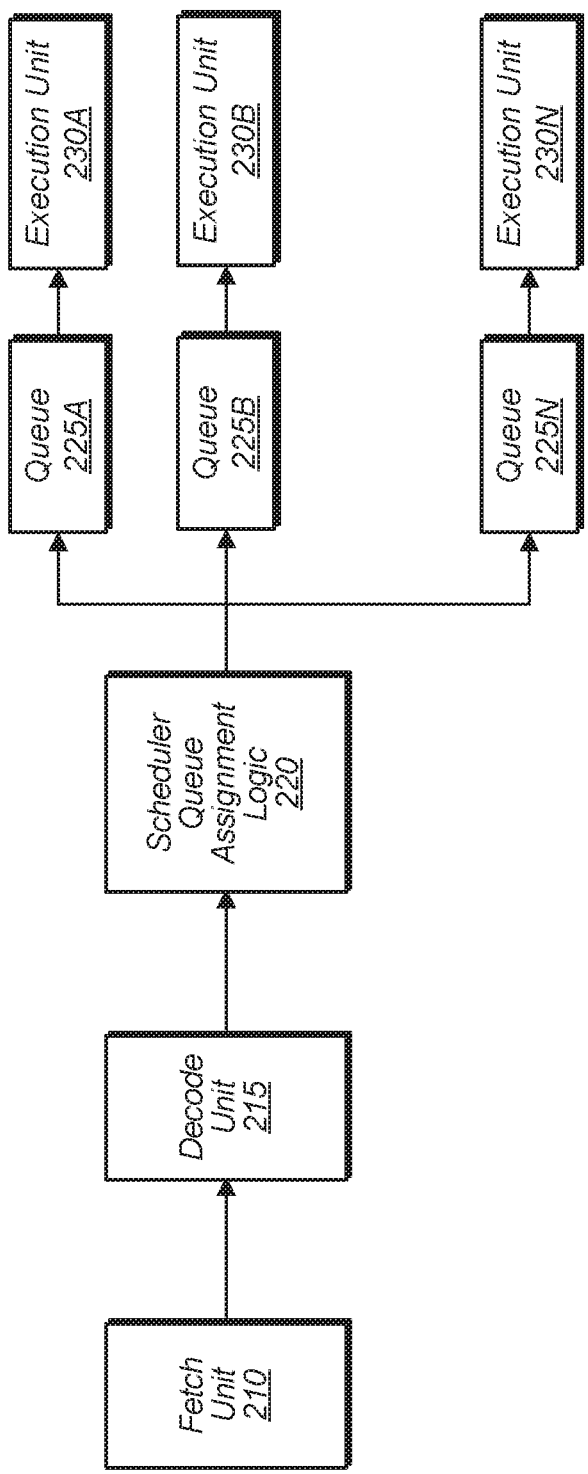
FIG. 2 is a block diagram of one implementation of a processor pipeline.

Turning now to FIG. 2, a block diagram of one implementation of a processor pipeline 200 is shown. In various implementations, processors 105A-N (of FIG. 1) include one or more instantiations of processor pipeline 200. In one implementation, processor pipeline 200 includes at least fetch unit 210, decode unit 215, scheduler queue assignment logic 220, queues 225A-N, and execution units 230A-N. It is noted that queues 225A-N are also referred to as scheduler queues herein. It should also be understood that processor pipeline 200 also includes other components (e.g., branch prediction unit, instruction cache) which are not shown to avoid obscuring the figure. In other implementations, processor pipeline 200 is structured in other suitable manners.

In one implementation, fetch unit 210 fetches instructions of a program stream from memory and/or an instruction cache, and fetch unit 210 conveys the fetched instructions to decode unit 215. Decode unit 215 decodes the fetched instructions into instruction operations (or ops for short). It is noted that ops are also referred to as micro-ops or uops. Generally, an instruction operation is an operation that the hardware included in execution units 230A-N is capable of executing. In various implementations, each instruction translates to one or more ops which, when executed, result in the performance of the operations defined for that instruction according to the instruction set architecture. Any type of instruction set architecture is employed by processor pipeline 200. Decode unit 215 identifies the type of instructions, source operands, etc., and each decoded op includes the instruction along with some of the decode information. In implementations in which each instruction translates to a single op, each op is the corresponding instruction or a portion thereof (e.g., the opcode field or fields of the instruction). In some implementations, decode unit 215 includes any combination of circuitry and/or microcode for generating ops for instructions. For example, in one implementation, relatively simple op generations (e.g., one or two ops per instruction) are handled in hardware while more extensive op generations (e.g., more than three ops for an instruction) are handled in microcode.

The ops from decode unit 215 are provided to scheduler queue assignment logic 220. Scheduler queue assignment logic 220 determines how to assign the ops to the scheduler queues 225A-N. In various implementations, there are multiple different assignment permutations for assigning ops to the queues 225A-N. As used herein, an assignment permutation is defined as a particular op-to-queue assignment for one or more ops to one or more queues. In one implementation, scheduler queue assignment logic 220 attempts to select assignment permutations that will result in execution throughput being maximized for processor pipeline 200. Scheduler queue assignment logic 220 also selects assignment permutations so that ops will be assigned to queues 225A-N which are coupled to execution units 230A-N that are able to actually execute the specific type of op. As shown in processor pipeline 200, each queue 225A-N is coupled to a corresponding execution unit 230A-N. However, in other implementations, one or more queues 225A-N are coupled to multiple execution units 230A-N.

After selecting a valid assignment permutation in a given clock cycle, the ops are assigned to queues 225A-N to match the selected assignment permutation. When the dependencies are resolved and the ops are ready to execute, pickers (not shown) will pick the ops out of queues 225A-N to execute on the execution units 230A-N. In one implementation, individual execution units 230A-N are able to execute only a subset of the total number of different type of ops that are encountered in a typical program sequence. Accordingly, scheduler queue assignment logic 220 assigns ops to the appropriate queues 225A-N so that these ops will be executed by an execution unit 230A-N that is able to execute these specific types of ops.

Figure 3:
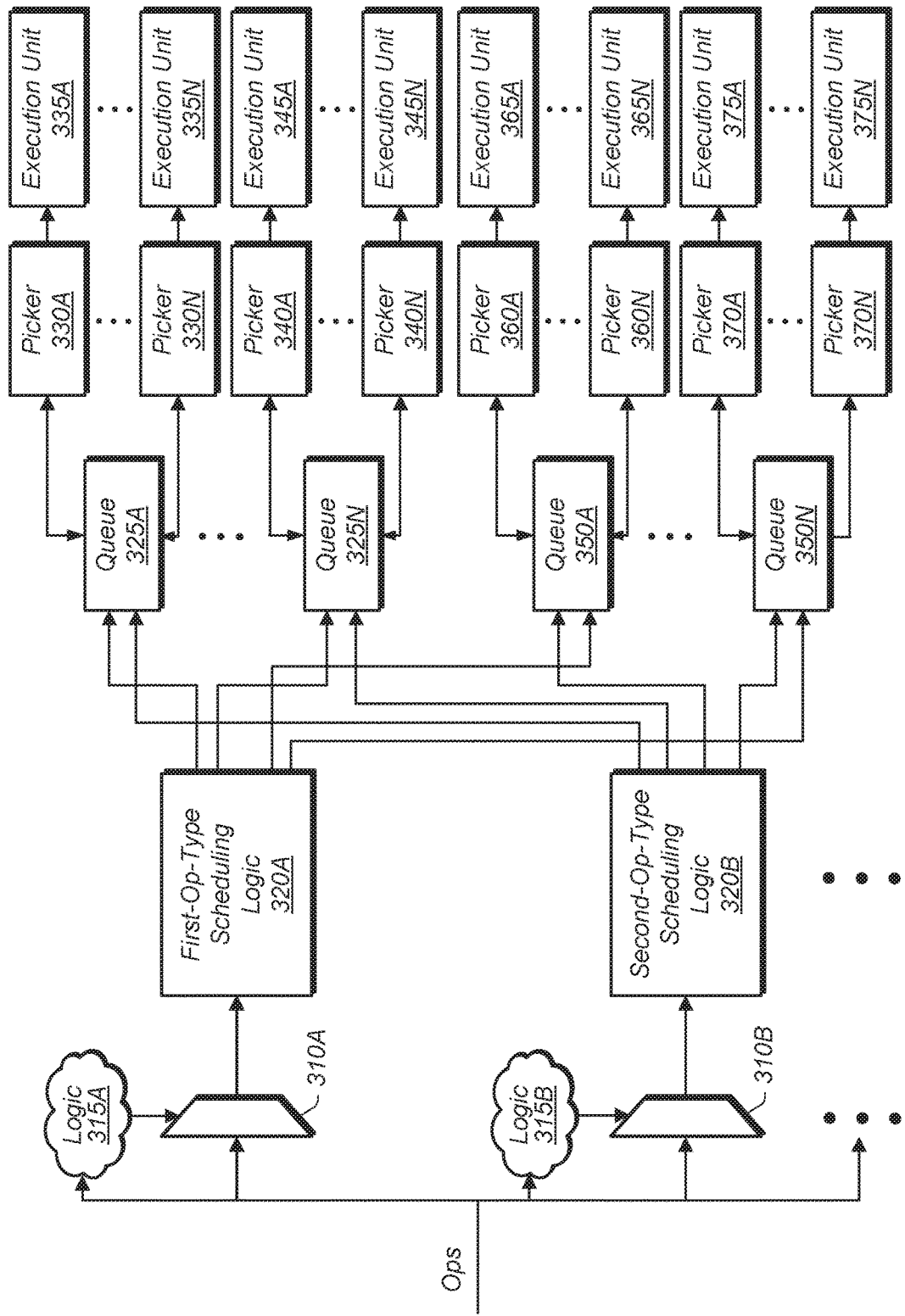
FIG. 3 is a block diagram of one implementation of a portion of a processor pipeline.

Referring now to FIG. 3, a block diagram of one implementation of a portion of a processor pipeline 300 is shown. In one implementation, the portion of processor pipeline 300 is included within processor pipeline 200. A decode unit (not shown) decodes instructions into ops, and then the ops are provided to multiplexer (or mux) 310A and mux 310B. Each mux 310A-B selects the first N ops that are of the type corresponding to the attached scheduling logic unit 320A-B, respectively. Logic units 315A-B provide the select signals which are coupled to muxes 310A-B, respectively.

First-op-type scheduling logic unit 320A and second-op-type scheduling logic unit 320B are representative of any number and type of scheduling logic units. Similarly, muxes 310A-B are representative of any number of muxes which are coupled to any number of scheduling logic units. Depending on the implementation, the processor processes any number of different op types (e.g., ALU ops, address generation ops, floating point ops, fixed point ops, branch ops, multiply ops, division ops). In one implementation, first-op-type scheduling logic unit 320A assigns ALU ops to queues 325A-N, second-op-type scheduling logic unit 320B assigns address generation ops to queues 350A-N, and so on. In other implementations, first-op-type scheduling logic unit 320A and second-op-type scheduling logic unit 320B assign other types of ops to corresponding queues.

In one implementation, each queue 325A-N and 350A-N stores ops of the first type and ops of the second type. In another implementation, one or more of queues 325A-N and 350A-N only stores ops of the first type or second type. In implementations with more than two types of ops, each queue 325A-N and 350A-N stores three or more types of ops, two or more types of ops, or a single type of op. It should be understood that different implementations will have different numbers and types of queues storing any number of different types of ops.

Each queue 325A-N has any number of pickers 330A-N and 340A-N which pick an op for execution on a corresponding execution unit 335A-N or 345A-N. Similarly, each queue 350A-N has any number of pickers 360A-N and 370A-N which pick an op for execution on a corresponding execution unit 365A-N or 375A-N. In one implementation, there is a picker 330A-N for queue 325A for each different type of op that is able to be stored in queue 325A. Each different type of op will be executed on a different type of execution unit, with execution units 335A-N representative of any number of different execution units which execute different types of ops. It is noted that in one implementation, some execution units are able to execute more than one type of op.

For the other queues, each picker picks ops from the queue that will be executed on an execution unit coupled to the picker. For example, pickers 340A-N pick ops from queue 325N to be executed on execution units 345A-N respectively, pickers 360A-N pick ops from queue 350A to be executed on execution units 365A-N respectively, and pickers 370A-N pick ops from queue 350N to be executed on execution units 375A-N respectively. In one implementation, there is a different execution unit coupled to each queue (via a picker) for each different type of op supported by the processor pipeline. However, in some implementations, some of the queues store only a subset of all of the different types of ops that are being executed by the processor pipeline. For example, in an implementation where the processor executes two types of ops (ALU and address generation ops), some queues store only ALU ops while other queues store only address generation ops.

It should be understood that the number of scheduler queues and execution units for the different op types varies from implementation to implementation. The examples described throughout this disclosure are meant to illustrate non-limiting examples of implementations. In other implementations, processors employing other numbers of scheduler queues, execution units, and other related structures are possible and are contemplated.

Figure 4:
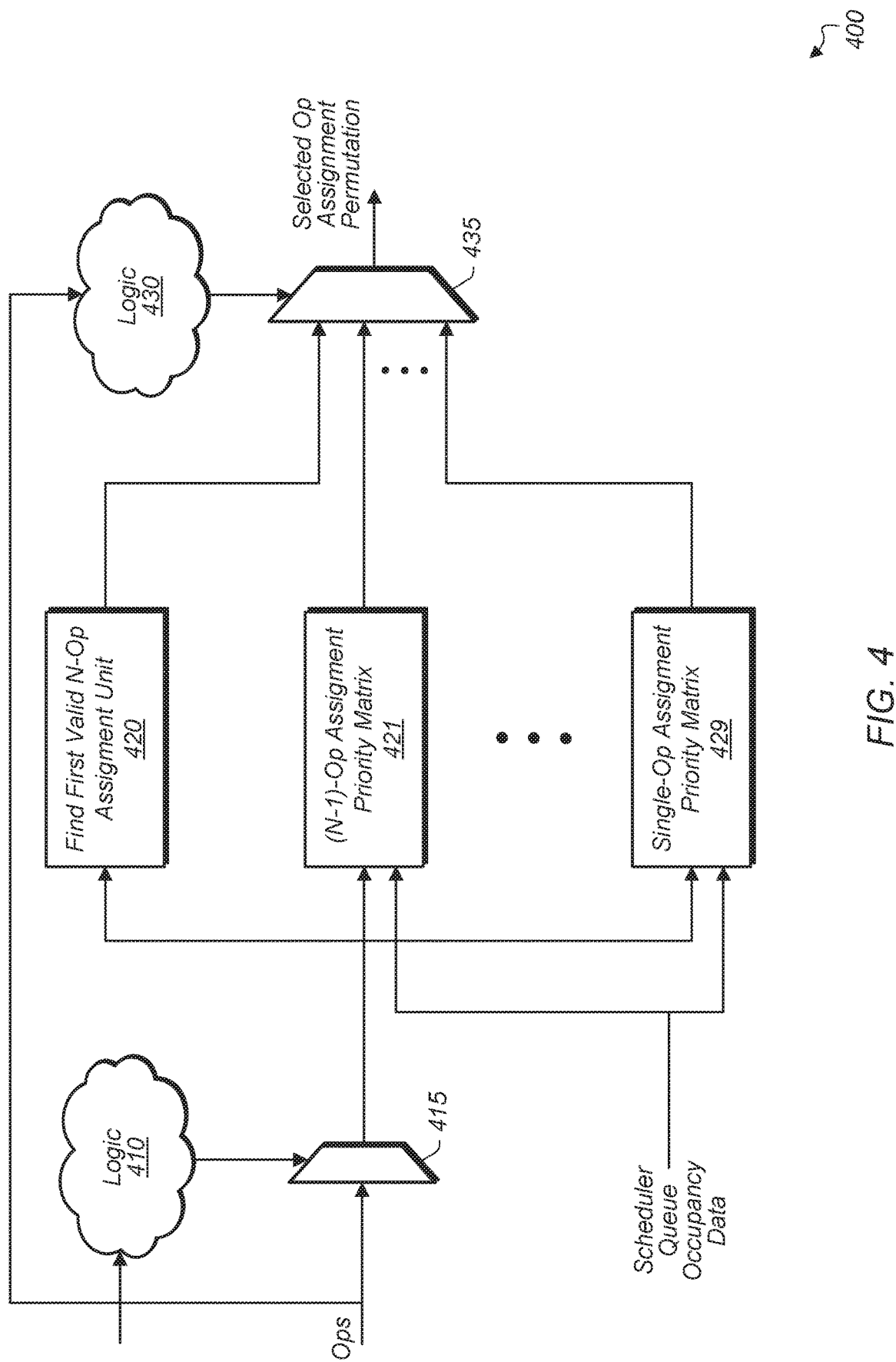
FIG. 4 is a block diagram of one implementation of scheduler queue assignment logic.

Turning now to FIG. 4, a block diagram of one implementation of a scheduler logic unit 400 for a given op type is shown. In one implementation, scheduler queue assignment logic (e.g., scheduler queue assignment logic 220 of FIG. 2) includes a separate scheduler logic unit 400 for each different op type. In another implementation, first-op-type scheduling logic 320A and second-op-type scheduling logic 320B include the components shown in scheduler logic unit 400.

In one implementation, ops from a decode unit are coupled to logic unit 410, mux 415, and logic unit 430. Logic unit 410 generates the select signal that selects only the ops from the decode unit that are of the given type corresponding to the particular scheduler logic unit 400. For example, if 10 ops are decoded by the decode unit in a given cycle, and only three ops are of the given type corresponding to the particular scheduler logic unit 400, then these three ops will be output from mux 415 to unit 420 and priority matrices 421-429. It is noted that the number of ops decoded by the decode unit varies from cycle to cycle and from implementation to implementation, and the number of ops of the given type will also vary from cycle to cycle and from implementation to implementation.

The ops that are output from mux 415 are provided to unit 420 and priority matrices 421-429. In one implementation, unit 420 is a find first valid N-op assignment unit, wherein N is an integer and wherein the value of N is determined by the number of pickers feeding execution units of the given op type. For example, if there are six pickers coupled to execution units of the given op type, then N is equal to six, and unit 420 determines which assignment permutations are valid for all of the different possible combinations of assigning six ops to the six different scheduler queues which have pickers feeding execution units of the given op type. Then, unit 420 selects the first valid assignment permutation out of the different possible assignment permutations. This assignment permutation is coupled to mux 435. It is noted that in one implementation, there is a one-to-one correspondence of picker to execution unit, and each picker is attached to a scheduler queue. The picker selects an op out of its attached scheduler queue which is executable by the execution unit coupled to the picker.

In one implementation, (N−1)-op assignment priority matrix 421 determines which assignment permutations are valid for all of the different permutation combinations of assigning (N−1) ops to (N−1) different scheduler queues. In the above example, if N=6, then priority matrix 421 checks the validity of the different assignment permutations when five ops are assigned to five of the six scheduler queues. Priority matrix 421 also receives scheduler queue occupancy data which indicates how many pending ops are already stored in each of the scheduler queues. In one implementation, priority matrix 421 selects a valid assignment permutation that does not assign an op to the queue with the highest occupancy.

Depending on the implementation, there will be any number of other priority matrices which check the validity of the different assignment permutations when (N−2) ops are assigned to (N−2) of the N scheduler queues, check the validity of the different assignment permutations when (N−3) ops are assigned to (N−3) of the N scheduler queues, and so on. In one implementation, each of these priority matrices selects a valid assignment permutation that avoids assigning ops to the scheduler queues which already store the most ops among the N different scheduler queues. These selected assignment permutations are then coupled to mux 435.

The final priority matrix shown in scheduler logic unit 400 is single-op assignment priority matrix 429. Priority matrix 429 checks the validity of assigning a single op to each of the N different scheduler queues. In one implementation, priority matrix 429 prioritizes assigning the single op to the scheduler queue storing the fewest number of ops among the different scheduler queues. Priority matrix 429 selects a valid assignment from the N different possible assignments and then sends an indication of this selected assignment to mux 435.

In one implementation, logic unit 430 determines how many ops to assign to scheduler queues in the given clock cycle. In one implementation, logic unit 430 guarantees that the number of ops that are assigned do not require more than one op per picker-to-execution unit in the given clock cycle. In one implementation, logic unit 430 determines how many ops to assign in parallel with unit 420 and priority matrices 421-429 selecting valid assignment permutations. Logic unit 430 generates a select signal based on the determination of how many ops to assign to scheduler queues in the given clock cycle, and logic unit 430 conveys this select signal to mux 435. Then, mux 435 couples a particular op assignment permutation to the output of mux 435 based on the select signal generated by logic unit 430. For example, in one implementation, the inputs to mux 435 are different op assignment permutations for assigning N ops, N−1 ops, N−2 ops, and so on down to assigning 1 op. The select signal from logic unit 430 determines which of these assignment permutations is coupled to the output of mux 435. The scheduler queue assignment logic (e.g., scheduler queue assignment logic 220 of FIG. 2) uses this selected op assignment permutation to determine how to assign ops to scheduler queues in the given clock cycle.

Figure 5:
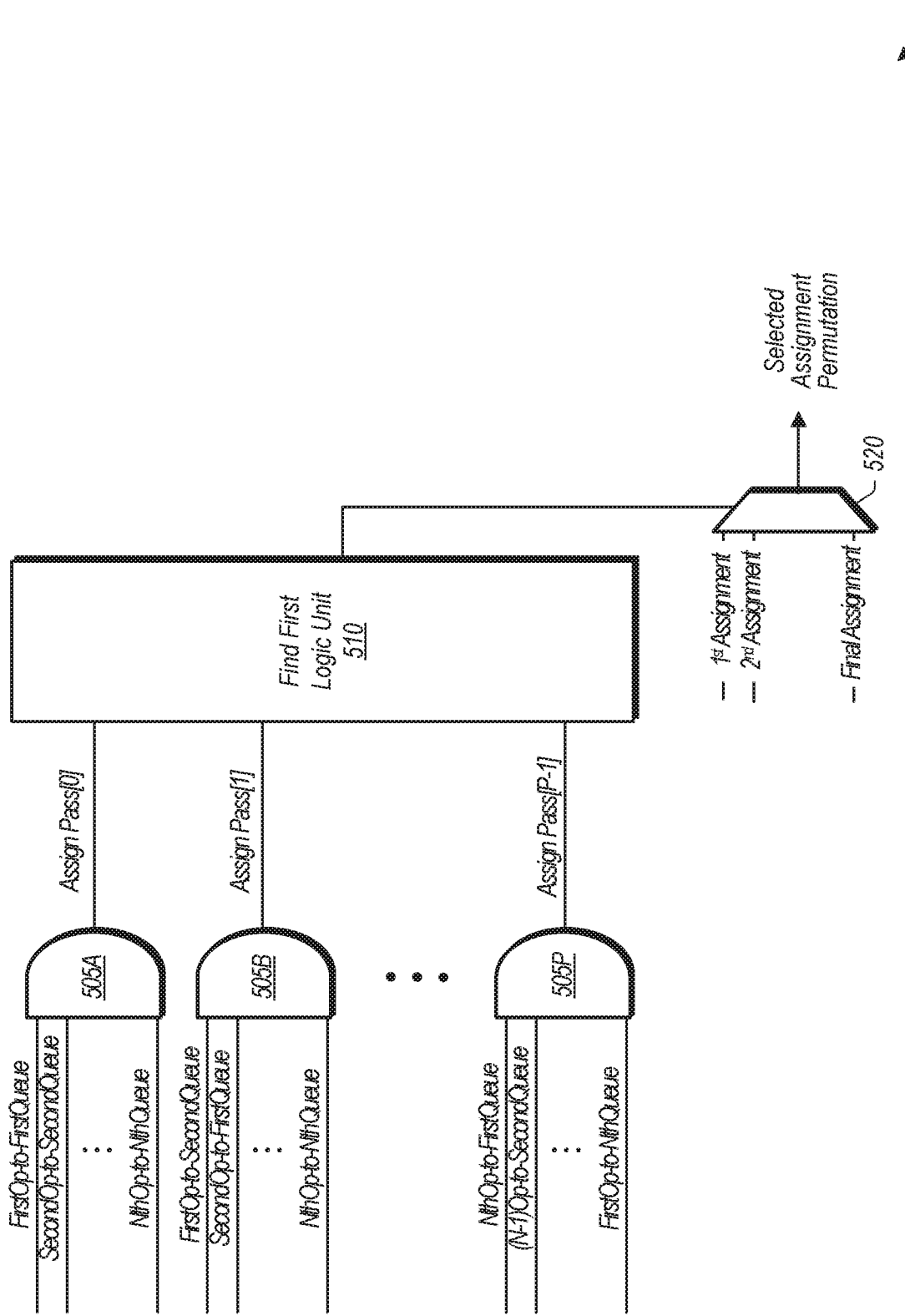
FIG. 5 is a block diagram of one implementation of a find first valid N-op assignment unit.

Referring now to FIG. 5, a block diagram of one implementation of a find first valid N-op unit 500 is shown. In one implementation, the components of find first valid N-op assignment unit 500 are included within find first valid N-op assignment unit 420 (of FIG. 4). Find first valid N-op assignment unit 500 attempts to find a valid assignment permutation for assigning ops to all of the available scheduler queues with attached pickers for a specific op type in a given clock cycle. In one implementation, find first valid N-op assignment unit 500 includes AND-gates 505A-P, logic unit 510, and mux 520. In other implementations, find first valid N-op assignment unit 500 is implemented using other components and/or using other arrangements of components.

The number of AND-gates 505A-P varies according to the implementation and is based on the number of different possible assignment permutations for the number of pickers feeding execution units of the given op type. In one implementation, there is a different AND-gate 505A-P for each different possible assignment permutation of ops to scheduler queues with attached pickers for the given op type. For example, if there are three picker-to-execution-unit combinations attached to scheduler queues for the given op type corresponding to unit 500, then there are six AND-gates 505A-P to test each of the six different possible assignment permutations of three ops to the three scheduler queues. For other numbers of scheduler queue, picker, to execution unit combinations for the given type of op, the number of AND-gates 505A-P will vary to test out all of the different possible assignment permutations for assigning ops to all of the corresponding scheduler queues.

Each AND-gate 505A-P tests the validity of an assignment of ops to the various scheduler queues based on the picker-to-execution unit combinations which are attached to the scheduler queues. The first, second, and Nth ops refer to the ops decoded by the decode unit in the current clock cycle. The first op refers to the oldest op in program order, the second op refers to the second oldest op in program order, and so on. In one implementation, there is a one-to-one correspondence between pickers and execution units. In other words, each picker is coupled to a corresponding execution unit. As previously noted, in one implementation, scheduler queues have attached pickers which feed execution units, and these execution units are only able to execute a subset of op types. Each AND gate 505A-P determines if the execution units fed by the pickers coupled to the scheduler queues are able to execute the op which is assigned to the scheduler queue for a given assignment permutation. For a given AND gate, if each execution unit is able to execute the op assigned to its corresponding scheduler queue, then the given AND gate generates a high output (i.e., "1" bit) to indicate that the assignment permutation is valid. Otherwise, if any of the execution units are unable to execute the op assigned to its corresponding scheduler queue, then the given AND gate generates a low output (i.e., "0" bit).

In one implementation, find first logic unit 510 selects the first "1" output from AND gates 505A-P. The direction that constitutes the "first" "1" output varies according to the implementation. In one implementation, the first "1" output is from the direction of AND-gate 505A, while in another implementation, the first "1" output is from the direction of AND-gate 505P. In other implementations, find first logic unit 510 uses other techniques for determining which assignment permutation to select when there are multiple valid assignment permutations. The output of find first logic unit 510 is coupled to mux 520, and this output of find first logic unit 510 selects one of the assignment permutation inputs to mux 520. In one implementation, each assignment permutation input to mux 520 specifies the assignment of ops to scheduler queues in a manner which is usable by subsequent logic units to cause these ops to be assigned to their corresponding scheduler queues if this assignment permutation ends up being the one that is selected by the overall scheduler queue assignment logic (e.g., scheduler queue assignment logic 220 of FIG. 2). It is noted that in other implementations, find first valid N-op unit 500 is implemented with other arrangements of logic-gates to perform functions equivalent to those shown in FIG. 5.

Figure 6:
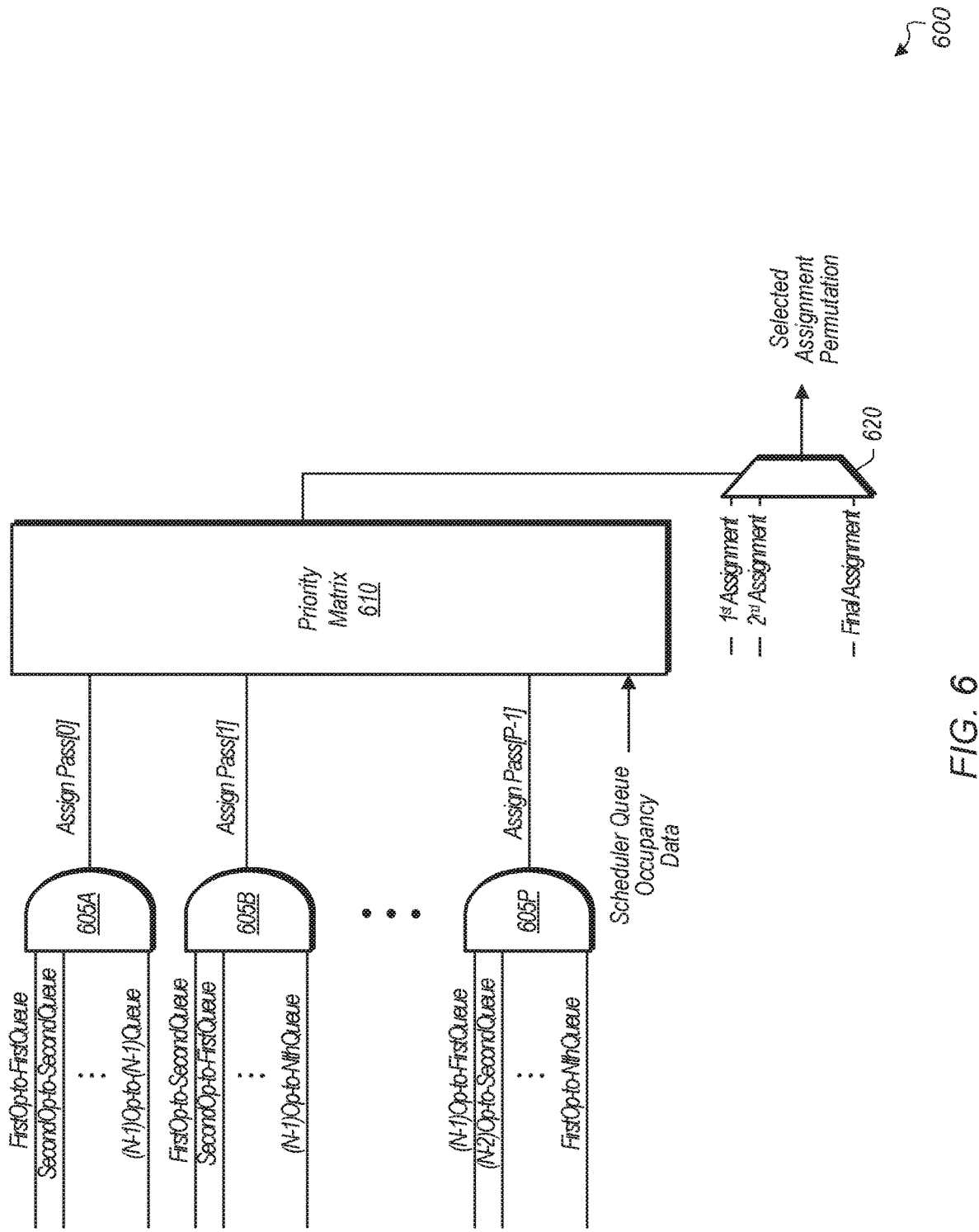
FIG. 6 is a block diagram of one implementation of a priority matrix for selecting an assignment permutation.

Turning now to FIG. 6, a block diagram of one implementation of a priority matrix 610 for selecting an assignment permutation is shown. In one implementation, priority matrix 421 (of FIG. 4) includes the components of priority matrix 610. In one implementation, priority matrix 610 is implemented to select a valid assignment permutation when (N−1) ops are assigned to (N−1) scheduler queues out of a total of N scheduler queues. This leaves one of the scheduler queues without an assigned op for the given clock cycle.

Similar to find first logic unit 500 of FIG. 5, priority matrix 610 is coupled to a plurality of AND-gates 605A-P which test the validity of the different possible assignment permutations for assigning (N−1) ops to (N−1) scheduler queues. In one implementation, priority matrix 610 also receives scheduler queue occupancy data which specifies the number of ops already stored in the N scheduler queues. In one implementation, priority matrix 610 selects the first valid assignment permutation that does not assign an op to the scheduler queue with the most ops (i.e., highest occupancy) in the given clock cycle. This assignment permutation is then selected out of the inputs coupled to mux 620. If subsequent logic units determine that (N−1) ops should be assigned in the given clock cycle, then this assignment permutation will be used by the scheduler queue assignment logic to assign ops to scheduler queues in the given clock cycle. The scheduler queue assignment logic also includes other priority matrices which follow the same structure as priority matrix 610. These other priority matrices are used to determine assignment permutations when (N−2) ops are assigned in the given clock cycle, when (N−3) ops are assigned in the given clock cycle, and so on, down to assigning 1 op in the given clock cycle.

Figure 7:
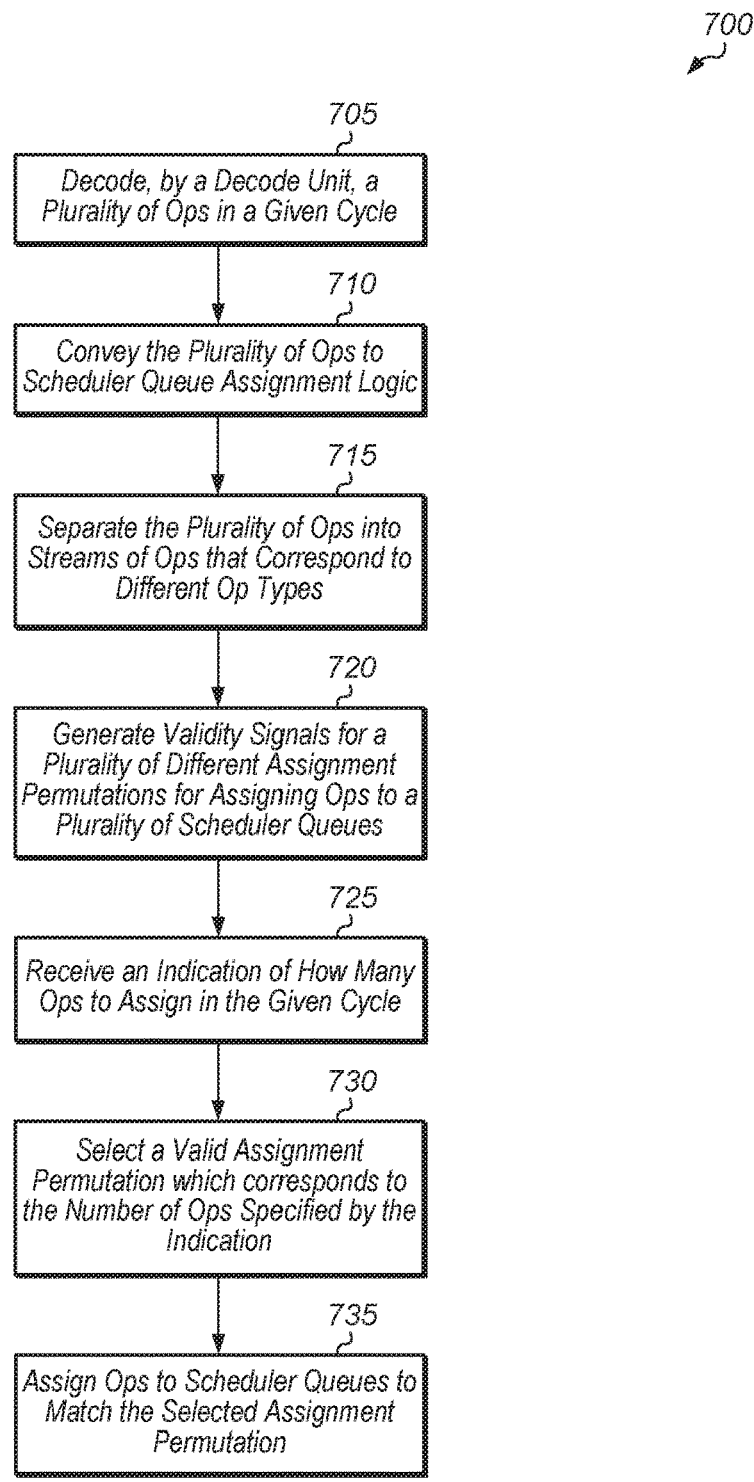
FIG. 7 is a generalized flow diagram illustrating one implementation of a method for implementing scheduler queue assignment logic.
Figure 8:
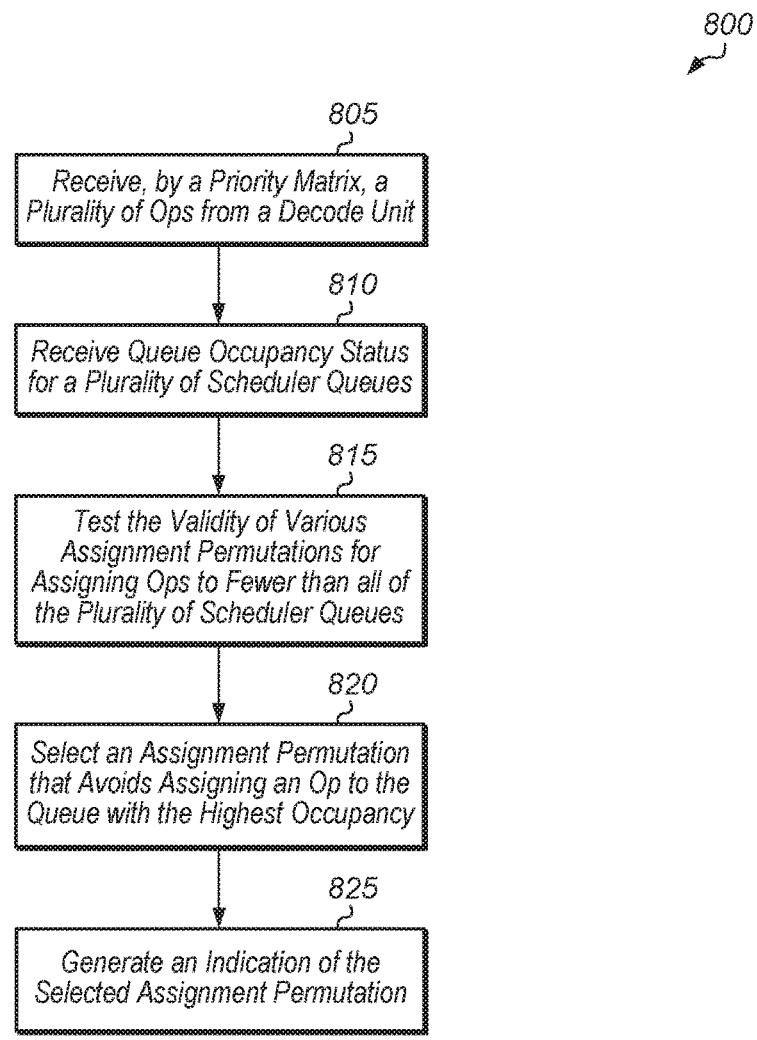
FIG. 8 is a generalized flow diagram illustrating one implementation of a method for implementing a priority matrix.

Referring now to FIG. 7, one implementation of a method 700 for implementing scheduler queue assignment logic is shown. For purposes of discussion, the steps in this implementation and those of FIG. 8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A decode unit decodes a plurality of ops in a given cycle (block 705). The decode unit conveys the plurality of ops to scheduler queue assignment logic (block 710). The scheduler queue assignment logic separates the plurality of ops into streams of ops that correspond to different op types (block 715). Then, for each op type, the scheduler queue assignment logic generates validity signals for a plurality of different assignment permutations for assigning ops to a plurality of scheduler queues (block 720). In one implementation, the scheduler queue assignment logic generates validity signals for all of the different possible assignment permutations in block 720. All of the different possible assignment permutations include permutations for different numbers of ops ranging from 1 to the number of scheduler queues.

Also, in parallel with blocks 715 and 720, the scheduler queue assignment logic receives an indication of how many ops to assign in the given cycle (block 725). Next, the scheduler queue assignment logic selects a valid assignment permutation which corresponds to the number of ops specified by the indication (block 730). In one implementation, the scheduler queue assignment logic selects the first valid assignment permutation in block 730. In other implementations, the scheduler queue assignment logic uses other techniques for determining which assignment permutation to select when multiple assignment permutations are valid. Then, the scheduler queue assignment logic assigns ops to scheduler queues to match the selected assignment permutation (block 735). After block 735, method 700 ends. It is noted that in one implementation, method 700 is repeated for each subsequent clock cycle.

Turning now to FIG. 8, one implementation of a method 800 for implementing a priority matrix is shown. A priority matrix receives a plurality of ops from a decode unit (block 805). The priority matrix also receives queue occupancy status for a plurality of scheduler queues (block 810). The priority matrix tests the validity of various assignment permutations for assigning ops to fewer than all of the plurality of scheduler queues (block 815). For example, if there are five scheduler queues, then in one implementation, the priority matrix tests the validity of different ways of assigning four ops to four of the five scheduler queues. In another implementation, the priority matrix tests the validity of different ways of assigning three ops to three of the five scheduler queues. It should be understood that other implementations will have other numbers of scheduler queues besides five.

Next, the priority matrix selects an assignment permutation that avoids assigning an op to the queue with the highest occupancy (block 820). In other implementations, the priority matrix selects an assignment permutation that avoids assigning ops to the two queues with the two highest occupancies, selects an assignment permutation that avoids assigning ops to the three queues with the three highest occupancies, and so on. Then, the priority matrix generates an indication of the selected assignment permutation (block 825). In one implementation, the priority matrix conveys the indication of the selected assignment permutation to a mux at the next level of the scheduler queue assignment logic. After block 825, method 800 ends. It is noted that in one implementation, method 800 is performed for each clock cycle. Additionally, in one implementation, the scheduler queue assignment logic includes multiple priority matrices, and method 800 is performed for each different priority matrix.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a plurality of execution units;
a plurality of scheduler queues coupled to the plurality of execution units;
a decode unit; and
scheduling logic coupled to the decode unit and the plurality of scheduler queues, wherein the scheduling logic comprises circuitry configured to:
receive a plurality of operations from the decode unit in a given clock cycle;
determine a plurality of assignment permutations of the plurality of operations, wherein an assignment permutation defines an assignment of one or more of the plurality of operations to one or more of the plurality of scheduler queues;
receive an indication of a given number of operations to assign to one or more of the plurality of scheduler queues in the given clock cycle;
select, based at least in part on the given number, one of the plurality of assignment permutations with no more than one operation per scheduler queue; and
assign operations that match the selected one of the plurality of assignment permutations to the one or more of the plurality of scheduler queues while a number of operations assigned does not exceed more than one operation per execution unit in the given clock cycle.

2. The system as recited in claim 1, wherein the circuitry is further configured to avoid assigning an operation to a scheduler queue with a highest number of currently stored operations in the given clock cycle.

3. The system as recited in claim 1, wherein the plurality of assignment permutations comprise assignment permutations for at least two different numbers of operations to assign in the given clock cycle.

4. The system as recited in claim 1, wherein the plurality of operations comprise operations of a first type and operations of a second type.

5. The system as recited in claim 4, wherein the circuitry is further configured to:
determine whether a first plurality of assignment permutations for operations of the first type are valid and select, from the first plurality of assignment permutations, a first assignment permutation that is valid;
determine whether a second plurality of assignment permutations for operations of the second type are valid and select, from the second plurality of assignment permutations, a second assignment permutation that is valid;
assign operations of the first type to the plurality of scheduler queues in the given clock cycle to match the first assignment permutation; and
assign operations of the second type to the plurality of scheduler queues in the given clock cycle to match the second assignment permutation.

6. The system as recited in claim 1, wherein the plurality of assignment permutations comprise all possible assignment permutations for the given number of operations and the plurality of scheduler queues.

7. The system as recited in claim 1, wherein:
the operations that match the one of the plurality of assignment permutations correspond to an assignment permutation that is valid; and
a given assignment permutation is valid when each operation of the given assignment permutation is assigned to an execution unit capable of executing a respective assigned operation.

8. A method comprising:
receiving a plurality of operations from a decode unit in a given clock cycle;
determining a plurality of assignment permutations of the plurality of operations, wherein an assignment permutation defines an assignment of one or more of the plurality of operations to one or more of a plurality of scheduler queues;
receiving an indication of a given number of operations to assign to one or more of the plurality of scheduler queues in the given clock cycle;
selecting, based at least in part on the given number, one of the plurality of assignment permutations with no more than one operation per scheduler queue; and
assigning operations that match the selected one of the plurality of assignment permutations to the one or more of the plurality of scheduler queues while a number of operations assigned does not exceed more than one operation per execution unit in the given clock cycle.

9. The method as recited in claim 8, further comprising avoiding assigning an operation to a scheduler queue with a highest number of currently stored operations in the given clock cycle.

10. The method as recited in claim 8, wherein the plurality of assignment permutations comprise assignment permutations for at least two different numbers of operations to assign in the given clock cycle.

11. The method as recited in claim 8, wherein the plurality of operations comprise operations of a first type and operations of a second type.

12. The method as recited in claim 11, further comprising:
determining whether a first plurality of assignment permutations for operations of the first type are valid and selecting, from the first plurality of assignment permutations, a first assignment permutation that is valid;

determining whether a second plurality of assignment permutations for operations of the second type are valid and selecting, from the second plurality of assignment permutations, a second assignment permutation that is valid;

assigning operations of the first type to the plurality of scheduler queues in the given clock cycle to match the first assignment permutation; and assigning operations of the second type to the plurality of scheduler queues in the given clock cycle to match the second assignment permutation.

13. The method as recited in claim 8, wherein the plurality of assignment permutations comprise all possible assignment permutations for a given number of operations and the plurality of scheduler queues.

14. The method as recited in claim 8, wherein:

the operations that match the one of the plurality of assignment permutations correspond to an assignment permutation that is valid; and a given assignment permutation is valid when each operation of the given assignment permutation is assigned to an execution unit capable of executing a respective assigned operation.

15. An apparatus comprising:

a processor configured to be coupled to a memory;

wherein the processor is configured to:

receive a plurality of operations from a decode unit in a given clock cycle;

determine a plurality of assignment permutations of the plurality of operations, wherein an assignment permutation defines an assignment of one or more of the plurality of operations to one or more of a plurality of scheduler queues;

receive an indication of a given number of operations to assign to one or more of the plurality of scheduler queues in the given clock cycle;

select, based at least in part on the given number, one of the plurality of assignment permutations with no more than one operation per scheduler queue; and assign operations that match the selected one of the plurality of assignment permutations to the one or more of the plurality of scheduler queues while a number of operations assigned does not exceed more than one operation per execution unit in the given clock cycle.

16. The apparatus as recited in claim 15, wherein the processor is further configured to avoid assigning an operation to a scheduler queue with a highest number of currently stored operations in the given clock cycle.

17. The apparatus as recited in claim 15, wherein the plurality of assignment permutations comprise assignment permutations for at least two different numbers of operations to assign in the given clock cycle.

18. The apparatus as recited in claim 15, wherein the plurality of operations comprise operations of a first type and operations of a second type.

19. The apparatus as recited in claim 18, wherein the processor is further configured to:

determine whether a first plurality of assignment permutations for operations of the first type are valid and select, from the first plurality of assignment permutations, a first assignment permutation that is valid;

determine whether a second plurality of assignment permutations for operations of the second type are valid and select, from the second plurality of assignment permutations, a second assignment permutation that is valid;

assign operations of the first type to the plurality of scheduler queues in the given clock cycle to match the first assignment permutation; and assign operations of the second type to the plurality of scheduler queues in the given clock cycle to match the second assignment permutation.

20. The apparatus as recited in claim 15, wherein:

the operations that match the one of the plurality of assignment permutations correspond to an assignment permutation that is valid; and a given assignment permutation is valid when each operation of the given assignment permutation is assigned to an execution unit capable of executing a respective assigned operation.

* * * * *